Figure 1:
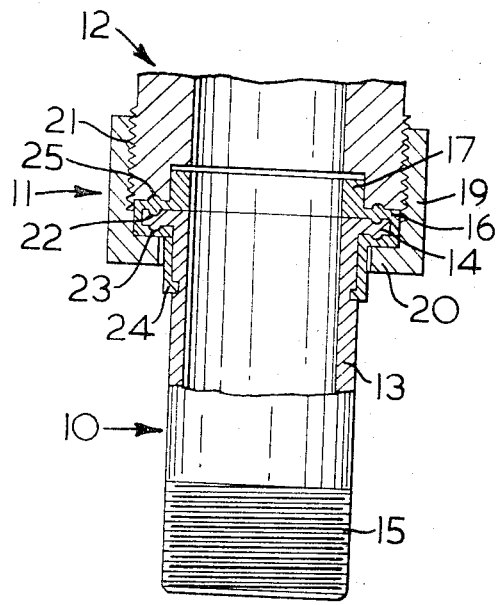

United States Patent [19]
Hanson

[11] 3,782,419
[45] Jan. 1, 1974

[54] PIPE UNION

[76] Inventor: Thomas A. Hanson, 455 Devonshire Ave., Woodstock, Ontario, Canada

[22] Filed: Nov. 8, 1971

[21] Appl. No.: 196,540

[30] Foreign Application Priority Data
Nov. 7, 1970 Great Britain.................. 53,053/70

[52] U.S. Cl.................................. 138/109, 285/47
[51] Int. Cl............................................ F16l 11/12
[58] Field of Search.......................... 138/109, 145; 285/47, 48, 52, 53; 264/296

[56] References Cited
UNITED STATES PATENTS

| 3,645,564 | 2/1972 | Corriston | 285/47 |
| 2,257,385 | 9/1941 | Keegan | 285/52 X |
| 2,574,191 | 6/1951 | Platzer | 285/52 |
| 3,516,447 | 6/1970 | Pittman | 132/109 |
| 2,405,038 | 7/1946 | Jennings | 138/145 X |
| 3,496,964 | 2/1970 | Thomas | 138/109 |
| 764,603 | 7/1904 | Lambert | 285/48 X |
| 2,700,343 | 1/1955 | Pezzillo | 285/48 X |

Primary Examiner—Herbert F. Ross
Attorney—George H. Spencer et al.

[57] ABSTRACT

A pipe union member includes a pipe having an outwardly directed annular flange adjacent a forward end of the pipe, the flange having forward and rear faces and an outer annular edge. A coating of electrical insulating material is moulded on to and extends around the forward end portion of the pipe. The coating extends over the forward and rear faces and the outer annular edge of the flange, and also extends forwardly of the flange to form a spigot insertable into the open end of another pipe.

1 Claim, 4 Drawing Figures

PIPE UNION

This invention relates to pipe union members for pipe coupling assemblies, for example union members for coupling gas pipes to gas meters.

In some pipe couplings, for example couplings to gas meters, it is necessary that one part of the coupling be electrically insulated from the part to which it is coupled.

It is therefore an object of this invention to provide an electrically insulating pipe union member, which is effective and inexpensive.

According to the invention, a pipe union member includes a pipe having an outwardly directed annular flange adjacent a forward end of the pipe, the flange having forward and rear faces and an outer annular edge, with a coating of electrical insulating material moulded on to and extending around the forward end portion of the pipe, the coating extending over the forward and rear faces and the outer edge of the flange, and also extending forwardly of the flange to form a spigot insertable into the open end of another pipe.

Preferably, at least one face of the flange is irregular so as to key the coating rotation relative to the pipe.

The coating may also extend rearwardly of the flange around an adjacent portion of the pipe, and this portion of the pipe may have an annular groove into which the coating extends, so as to provide a seal against ingress of water between the coating and the pipe.

The spigot formed by the coating may have an internal diameter substantially equal to the internal diameter of the adjacent end of the pipe. Alternatively, the pipe may itself have a spigot extending forwardly from the flange, with the spigot formed by the coating surrounding the pipe spigot. The spigot formed by the coating may project beyond the pipe spigot.

The coating may be of synthetic plastc material, for example nylon.

The pipe union member can form part of a pipe coupling assembly including a second pipe having an externally threaded end, and a coupling nut screwed on to the threaded end of the second pipe, the coupling nut projecting from the threaded end and having an inwardly directed flange spaced from the threaded end of the second pipe, with the spigot formed by the coating being located within the threaded end of the second pipe, and the coated flange being located between the threaded end and the inwardly directed flange of the coupling nut.

Advantageously, the pipe union member is made by extruding a tube, forming the outwardly directed annular flange by upsetting the material of the tube to form the flange, and then applying the coating. The tube is preferably formed of extruded steel.

Figure 2:
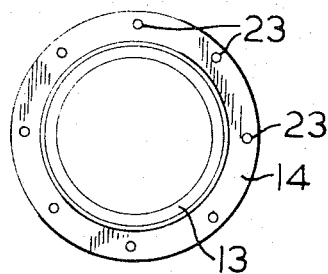
Figure 3:
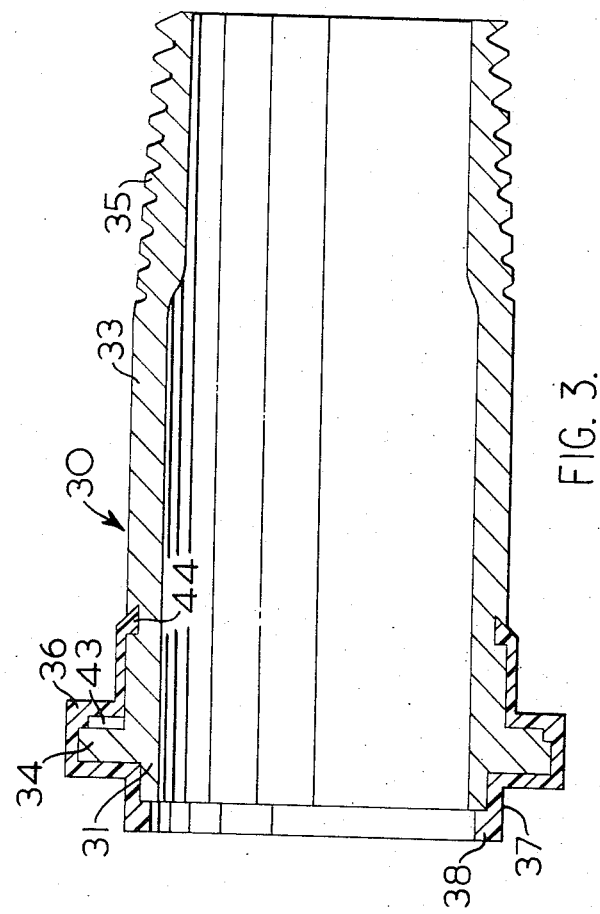
Figure 4:
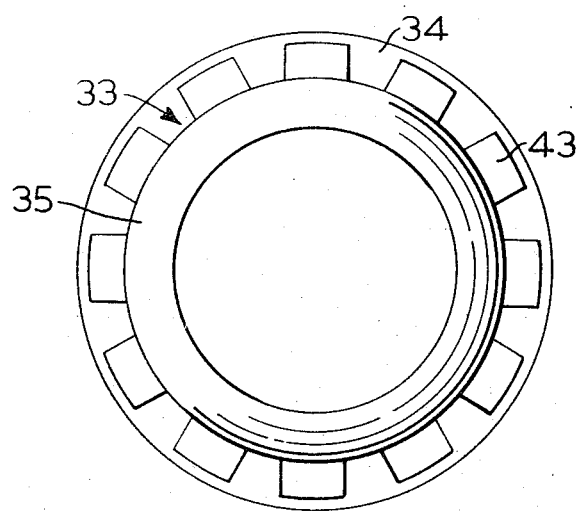

Embodiments of the invention will now be described, by way of example, with reference to the accompanying drawings, of which:

FIG. 1 is a longitudinal sectional view of a pipe coupling assembly according to one embodiment, FIG. 2 is an end view of the pipe of the pipe union member shown in FIG. 1, FIG. 3 is a longitudinal sectional view of a pipe union member according to a second embodiment, and FIG. 4 is an end view of the pipe of the pipe union member of FIG. 3.

Referring to the drawings, FIGS. 1 and 2 show a pipe coupling assembly including a gas pipe union member or swivel 10, a coupling nut 11, and a pipe 12 which forms the inlet or outlet of a gas meter (not shown). The pipe union member 10 includes an extruded steel pipe 13 having an outwardly directed annular flange 14 adjacent a forward end of the pipe. The flange 14 is formed on the pipe 13 by upsetting the material of the pipe 13 to form the flange 14. At the rear end 15, the pipe 13 is screw-threaded for connection to a further pipe.

A coating 16 of electrically insulating synthetic plastic material, in this case nylon, is moulded on to the pipe 13 so as to extend around the forward portion of the pipe, and to cover the forward and rear faces and the outer annular edge of the flange 14. The coating 16 also covers an adjacent portion of the pipe 13 rearwardly of the flange 14, and also extends forwardly of the flange 14 to form a parallel-walled spigot 17 of internal diameter equal to the internal diameter of the pipe 13, and outside diameter a little greater than the outside diameter of the pipe 13.

The coupling nut 11 has a generally cylindrical portion 19 and an inwardly directed flange 20 at one end of the cylindrical portion 19. The cylindrical portion 19 has internal screw threads 21 for engagement with corresponding threads on the outer surface of the end of the pipe 12. The front and rear faces of the flange 14 are formed with part-spherical recesses 22 and projections 23 respectively, and when the coating 16 is formed on the flange, corresponding projections and recesses respectively are formed in the coating 16 to key the coating to the flange. Thus, relative rotation between the pipe 13 and the coating 16 is prevented.

The portion of the pipe 13 rearwardly of the flange 14 covered by the coating 16 has an annular groove 24 into which the coating 16 extends at its rear end, thereby forming a seal to resist the ingress of water into the union member between the coating 16 and the pipe 13.

In use, the spigot 17 is inserted into the open end of the pipe 12. It will be seen that the pipe 12 has an enlarged open end, and the spigot 17 is a close fit therein. The spigot 17 is inserted until the end face of the pipe 12 engages the coating 16 on the front face of the flange 14. The end face of the pipe 12 may have part-spherical recesses 25 which receive corresponding part-spherical projections formed on the coating 16 on the forward face of the flange 14.

The coupling nut 11 is then passed along the pipe 13, and screwed onto the pipe 12 until the flange 20 of the nut 11 engages the coating 16 on the rear face of the flange 14. The nut 11 is then tightened until the flange 14 and coating 16 thereon are firmly engaged by the flange 20 of the nut 11 and the end face of the pipe 12. The coating 16 around the flange is arranged to be a close fit with the interior of the nut 11.

Thus, the pipe 12 is electrically insulated from the pipe 13, and ingress of water into the pipes 12, 13 through the coupling is resisted by the coating 16.

FIGS. 3 and 4 show a pipe union member 30 according to a second embodiment. The pipe union member 30 includes an extruded steel pipe 33 having a flange 34, and a spigot 31 extending forwardly from the flange 34. The spigot 31 has the same internal diameter as the portion of the pipe to the rear of the spigot, but has a smaller outside diameter. Again, the flange 34 is formed by an upsetting operation.

A coating 16 of nylon is moulded on to the pipe 33 and, besides extending around the flange rearwardly thereof, the coating 36 also extends forwardly of the flange 34 around the spigot 31 to form a coating spigot 37. The coating spigot 37 extends forwardly of the pipe spigot 31, and also extends partially inwardly over the front end face of the pipe spigot 31 to form an inwardly directed flange 38.

The rear face of the flange 34 has a series of generally rectangular projections 43, so as to key the coating to the flange 34. Rearwardly of the flange 34, the pipe has an annular groove 34 into which the coating 36 extends at its rearward end, to provide a seal.

The pipe union member 30 described with reference to FIGS. 3 and 4 is used in the same manner as the pipe union member 10 described with reference to FIGS. 1 and 2.

Although the spigots of the described embodiments are externally cylindrical, it is also within the scope of the invention to make the spigots of other external shape. For example, the spigots may have an external part-spherical spherical shape for engagement in a correspondingly shaped open end of a pipe.

I claim:

1. A pipe union member including a pipe having an outwardly directed annular flange adjacent a forward end of the pipe, said flange having forward and rear faces and an outer annular edge, and a coating of electrical insulating material moulded on to and extending around the forward end portion of the pipe, said coating extending over the forward and rear faces and the outer annular edge of the flange, the rear face of the flange being irregular so as to key the coating against rotation relative to the pipe, said coating also extending forwardly of the flange to form a spigot insertable into the open end of another pipe, and said coating further extending rearwardly of the flange around an adjacent part of the pipe, said adjacent part of the pipe having an annular groove spaced from said flange and into which the coating extends.

* * * * *